(12) United States Patent
Luo et al.

(10) Patent No.: US 11,308,638 B2
(45) Date of Patent: Apr. 19, 2022

(54) DEPTH ESTIMATION METHOD AND APPARATUS, ELECTRONIC DEVICE, PROGRAM, AND MEDIUM

(71) Applicant: SHENZHEN SENSETIME TECHNOLOGY CO., LTD., Shenzhen (CN)

(72) Inventors: Yue Luo, Shenzhen (CN); Sijie Ren, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 101 days.

(21) Appl. No.: 16/835,418

(22) Filed: Mar. 31, 2020

(65) Prior Publication Data

US 2020/0226777 A1 Jul. 16, 2020

Related U.S. Application Data

(63) Continuation of application No. PCT/CN2019/073820, filed on Jan. 30, 2019.

(30) Foreign Application Priority Data

Feb. 1, 2018 (CN) .......................... 201810103195.0

(51) Int. Cl.
*G06T 7/593* (2017.01)
*G06T 7/80* (2017.01)

(52) U.S. Cl.
CPC ................ *G06T 7/593* (2017.01); *G06T 7/85* (2017.01); *G06T 2207/10012* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2012/0032950 A1\* 2/2012 Lee ...................... H04N 13/398
345/419
2016/0219258 A1\* 7/2016 Woodgate ............ H04N 13/194
(Continued)

FOREIGN PATENT DOCUMENTS

CN 101907448 A 12/2010
CN 102523464 A 6/2012
(Continued)

OTHER PUBLICATIONS

"Unsupervised Learning of Depth and Ego-Motion from Video"; Jul. 2017; Tinghui zHou, Matthew Brown, Noah Snavely and Daid G. Lowe; Unsupervised Monocular Depth Estimation with Left-Right Consistency; reprinted from the Internet at: https://people.eecs.berkeley.edu/~tinghuiz/projects/SfMLearner/cvpr17_sfm_final.pdf, pp. 1851-1860.

(Continued)

*Primary Examiner* — Jiangeng Sun
(74) *Attorney, Agent, or Firm* — Cooper Legal Group, LLC

(57) ABSTRACT

A depth estimation method includes: taking a single image as a first image in binocular images, and obtaining a second image in the binocular images based on the first image via a first neural network; and obtaining depth information corresponding to the first image via a second neural network by performing binocular stereo matching on the first image and the second image.

20 Claims, 8 Drawing Sheets

(56) References Cited

U.S. PATENT DOCUMENTS

| | | | |
|---|---|---|---|
| 2019/0213481 A1* | 7/2019 | Godard | G06T 7/50 |
| 2020/0074661 A1* | 3/2020 | Anisimovskiy | G06T 7/593 |

FOREIGN PATENT DOCUMENTS

| | | |
|---|---|---|
| CN | 102750702 A | 10/2012 |
| CN | 106355570 A | 1/2017 |
| CN | 106504190 A | 3/2017 |
| CN | 106612427 A | 5/2017 |
| CN | 107578435 A | 1/2018 |
| CN | 108335322 A | 7/2018 |
| JP | H02101584 A | 4/1990 |
| JP | 2013240590 A | 12/2013 |
| JP | 2016157434 A | 9/2016 |
| WO | 2018006296 A1 | 1/2018 |

OTHER PUBLICATIONS

"Stereo Matching Based on RBF Neural Networks"; Nov. 2008; Chao Daiy, Yi Heming and Tao Gao; Application Research of Computers, vol. 25, No. 11, 3 pgs.

"Unsupervised Monocular Depth Estimation with Left-Right Consistency"; Apr. 2017; Clement Godard, Oisin Mac Aodha and Gabriel J. Brostow; IEEE Conference on Computer Vision and Pattern Recognition(CVPR); Reprinted from the Internet at: https://openaccess.thecvf.com/content_cvpr_2017/papers/Godard_Unsupervised_Monocular_Depth_CVPR_2017_paper.pdf, 14 pgs.

"Unsupervised CNN for Single View Depth Estimation"; Jul. 2016; Ravi Garg, Vijay Kumar, V.G.Custavo Carneiro and Ian Reid; Geometry to the Rescue; arXiv; Reprinted from the Internet at: https://cs.adelaide.edu.au/~carneiro/publications/1832.pdf, 16 pgs.

International Search Report in the international application No. PCT/CN2019/073820, dated May 8, 2019, 2 pgs.

First Office Action of the Chinese application No. 201810103195.0, dated Jan. 20, 2020, 19 pgs.

"Single View Stereo Matching"; Mar. 2018; Yue Luo, Jimmy Ren, Mude Lin, Jiahao Pange, Wenxiu Sun, Hongsheng Li and Liang Lin, provided by the Computer Vision Foundation; Reprinted from the Internet at: https://arxiv.org/pdf/1803.02612.pdf, 9 pgs.

First Office Action of the Japanese application No. 2020-5179331, dated May 25, 2021, 6 pgs.

"A Large Dataset to Train Convolutional Networks for Disparity, Optical Flow, and Scene Flow Estimation", Dec. 2015, Nikolaus Mayer, Eddy Ilg, Philip Hausser, Philipp Fischer, Daniel Cremers, Alexey Dosovitskiy and Thomas Brox, Computer Vision Foundation, 14 pgs.

"Deep3D: Fully Automatic 2D-to-3D Video Conversion with Deep Convolutional Neural Networks", Apr. 2106, Junyuan Xie, Ross Girshick and Ali Farhadi, Computer Science, Computer Vision and Pattern Recognition, 15 pgs.

"FlowNet: Learning Optical Flow with Convolutional Networks", May 2015, Philipp Fischer, Alexey Dosovitskiy, Eddy Ilg, Philip Hausser, Caner Hazirbas and Vladimir Golkov, Computer Science, Computer Vision and Pattern Recognition, 13 pgs.

First Office Action of the Korean application No. 10-2020-7009470, dated Feb. 17, 2021, 15 pgs.

English Translation of the Written Opinion of the International Search Authority in the international application No. PCT/CN2019/073820, dated May 8, 2019, 6 pgs.

* cited by examiner

DEPTH ESTIMATION METHOD AND APPARATUS, ELECTRONIC DEVICE, PROGRAM, AND MEDIUM

CROSS-REFERENCE TO RELATED APPLICATIONS

The present application is a continuation of International Application No. PCT/CN2019/073820, filed on Jan. 30, 2019, which claims priority to Chinese Patent Application No. 201810103195.0, filed on Feb. 1, 2018. The disclosures of International Application No. PCT/CN2019/073820 and Chinese Patent Application No. 201810103195.0 are hereby incorporated by reference in their entireties.

BACKGROUND

Depth estimation is an important issue in the field of computer vision. Accurate depth estimation methods are valuable for use in many fields, such as autonomous driving, 3D scene reconstruction, and augmented reality.

Driven by the development of convolutional neural networks, technologies related to depth estimation have developed rapidly.

SUMMARY

The present disclosure relates to computer vision technology, and in particular, to a depth estimation method and apparatus, an electronic device, a computer program, and a computer-readable storage medium.

Embodiments of the present disclosure provide technical solutions for depth estimation.

According to one aspect of the embodiments of the present disclosure, a depth estimation method is provided, including:

taking a single image as a first image in binocular images, and obtaining a second image in the binocular images based on the first image via a first neural network; and obtaining depth information corresponding to the first image via a second neural network by performing binocular stereo matching on the first image and the second image.

According to another aspect of the embodiments of the present disclosure, a depth estimation apparatus is provided, including:

an image obtaining module, configured to take a single image as a first image in binocular images, and obtain a second image in the binocular images based on the first image via a first neural network; and a stereo matching module, configured to obtain depth information corresponding to the first image via a second neural network by performing binocular stereo matching on the first image and the second image.

According to still another aspect of the embodiments of the present disclosure, a depth estimation apparatus is provided, including: a memory storing processor-executable instructions; and a processor arranged to execute the stored processor-executable instructions to perform operations of: taking a single image as a first image in binocular images, and obtaining a second image in the binocular images based on the first image via a first neural network; and obtaining depth information corresponding to the first image via a second neural network by performing binocular stereo matching on the first image and the second image.

According to still another aspect of the embodiments of the present disclosure, an electronic device is provided, including:

a memory, configured to store executable instructions; and a processor, configured to communicate with the memory to execute the executable instructions so as to perform the operations of the method according to any one of the forgoing embodiments of the present disclosure.

According to yet another aspect of the embodiments of the present disclosure, a computer program is provided, including a computer readable code, where when the computer readable code runs in a device, a processor in the device executes instructions for implementing the operations of the method according to any one of the foregoing embodiments of the present disclosure.

According to yet another aspect of the embodiments of the present disclosure, a non-transitory computer-readable storage medium is provided, which has stored thereon computer-readable instructions that, when executed by a processor, cause the processor to perform a depth estimation method, the method including: taking a single image as a first image in binocular images, and obtaining a second image in the binocular images based on the first image via a first neural network; and obtaining depth information corresponding to the first image via a second neural network by performing binocular stereo matching on the first image and the second image.

Based on the depth estimation method and apparatus, the electronic device, the computer program, and the computer-readable storage medium provided by the above embodiments of the present disclosure, a single image is taken as a first image in binocular images, and a second image in the binocular images is obtained based on the first image via a first neural network; and depth information corresponding to the first image is obtained via a second neural network by performing binocular stereo matching on the first image and the second image. Thus, depth estimation of the scene in a single image is implemented based on the single image without needing binocular cameras, thereby avoiding additional hardware overhead generated by binocular cameras and reducing the costs. Moreover, an error in obtained depth information caused by the inaccuracy of settings of binocular cameras can be avoided, and the accuracy of depth estimation is improved.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
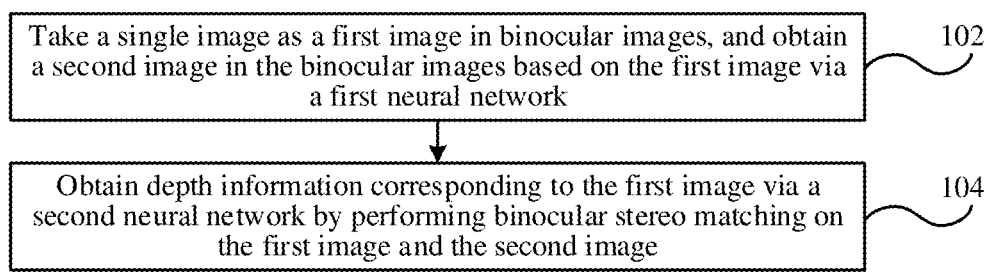
FIG. 1 is a flowchart of an embodiment of a depth estimation method according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of an embodiment of a depth estimation method according to the present disclosure. As shown in FIG. 1, the depth estimation method according to this embodiment includes the following operations.

At 102, a single image is taken as a first image in binocular images, and a second image in the binocular images is obtained based on the first image via a first neural network.

The binocular images are two images captured by binocular cameras or two of multiple images captured by multiocular cameras, and may be referred to as a left image and a right image. If the first image is the left image, the second image is the right image; or, if the first image is the right image, the second image is the left image. Further, the binocular images may also be referred to as a main image and a sub-image, and when any one of the binocular images is taken as the main image, the other image is taken as the sub-image.

In an optional example, the operation 102 may be performed by a processor by invoking a corresponding instruction stored in a memory, or may be performed by an image obtaining module run by the processor.

At 104, depth information corresponding to the first image is obtained via a second neural network by performing binocular stereo matching on the first image and the second image.

In at least one embodiment of the present disclosure, the first neural network and the second neural network may respectively be a multi-layer neural network (i.e., a deep neural network), such as a multi-layer convolutional neural network which may be, for example, any neural network such as LeNet, AlexNet, GoogLeNet, VGG, and ResNet. Neural networks of the same type and structure, or neural networks of different types and structures may be used as the first neural network and the second neural network.

In an optional example, the operation 104 may be performed by a processor by invoking a corresponding instruction stored in a memory, or may be performed by a stereo matching module run by the processor.

In the process of implementing the present disclosure, the inventor has found through research that the current depth estimation methods may be mainly divided into two categories. One is to use a large number of pixel-level depth labels to supervise neural networks, and to perform depth estimation through obtaining by trained neural networks; however, obtaining depth labels is not only expensive, but high quality and dense depth labels cannot be obtained by the existing technology. The second category is depth estimation methods based on binocular stereo matching. In these depth estimation methods, two images captured in different directions are used as inputs, and based on the rules of a geometric space, the depth can be obtained by computing the disparity between corresponding pixels of the two images. However, the accuracy of this category of prediction methods is limited by the settings of binocular cameras, and in this category of methods, additional hardware overhead is generated due to the need for binocular cameras. Based on the depth estimation method provided by the above embodiment of the present disclosure, a single image is taken as a first image in binocular images, and a second image in the binocular images is obtained based on the first image via a first neural network; and depth information is obtained via a second neural network by performing binocular stereo matching on the first image and the second image. Thus, depth estimation of the scene in a single image is implemented based on the single image without needing binocular cameras, thereby avoiding additional hardware overhead generated by binocular cameras and reducing the costs. Moreover, an error in obtained depth information caused by the inaccuracy of settings of binocular cameras can be avoided, and the accuracy of depth estimation is improved.

Figure 2:
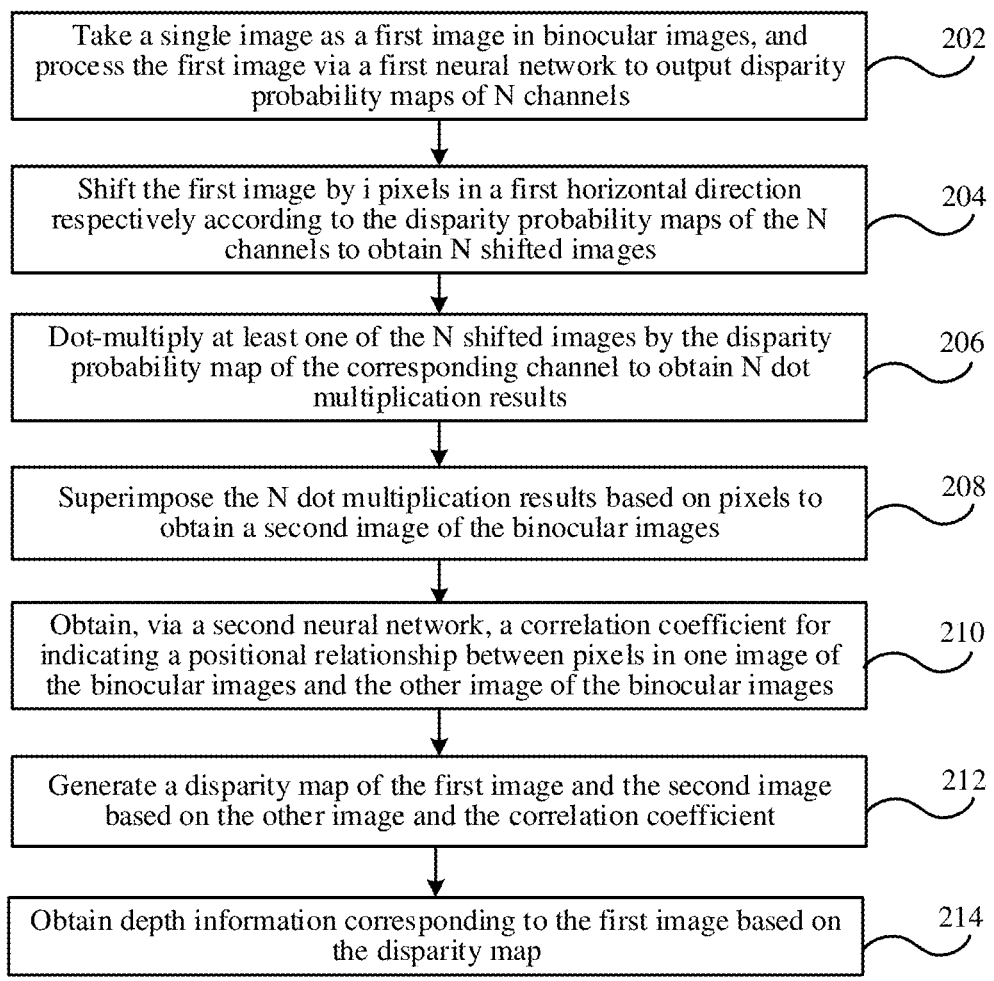
FIG. 2 is a flowchart of another embodiment of a depth estimation method according to the present disclosure.

FIG. 2 is a flowchart of another embodiment of a depth estimation method according to the present disclosure. As shown in FIG. 2, the depth estimation method according to this embodiment includes the following operations.

At 202, a single image is taken as a first image in binocular images, and the first image is processed via a first neural network to output disparity probability maps of N channels.

Different channels of the N channels correspond to different disparities, the disparity probability map of each channel represents a probability of a pixel on the first image being shifted by i disparities in a first horizontal direction, and after the probabilities are normalized, the sum of the probability values of one pixel on all the channels is 1, where i=0, 1, ..., N−1, and N is an integer greater than 1. If the first image is the left image, the first horizontal direction is a horizontal left direction; and if the first image is the right image, the first horizontal direction is a horizontal right direction. That is, if the first image is the left image, the disparity probability map of the i-th channel represents a probability of a pixel on the left image being horizontally shifted to the left by i disparities. For example, assuming the value of N is 5 and the first image is the left image, the disparity probability maps of the first, second, third, fourth, and fifth channels respectively represent the probabilities of a pixel on the left image being horizontally shifted to the left by 0, 1, 2, 3, and 4 disparities, and the probabilities of a certain pixel on the left image being horizontally shifted to the left by 0, 1, 2, 3, and 4 disparities may be, for example, 0.3, 0.4, 0.2, 0.1, and 0, respectively.

In an optional example, the operation 202 may be performed by a processor by invoking a corresponding instruction stored in a memory, or may be performed by a first sub-neural network unit of the image obtaining module run by the processor.

At 204, the first image is shifted by i pixels in the first horizontal direction respectively according to the disparity probability maps of the N channels to obtain N shifted images, where i=0, 1, ..., N−1, and N is an integer greater than 1.

In an optional example, the operation 204 may be performed by a processor by invoking a corresponding instruction stored in a memory, or may be performed by a shift unit of the image obtaining module run by the processor.

At 206, each of the N shifted images is dot-multiplied by the disparity probability map of the corresponding channel to obtain N dot multiplication results.

In an optional example, the operation 206 may be performed by a processor by invoking a corresponding instruction stored in a memory, or may be performed by a dot multiplication unit of the image obtaining module run by the processor.

At 208, the N dot multiplication results are superimposed based on pixels to obtain the second image of the binocular images.

Because left and right images captured by binocular cameras comply with a basic spatial rule, if the first image in the binocular images is a left image captured by binocular cameras, the second image in the binocular images is a right image captured by the binocular cameras; or if the first image in the binocular images is a right image captured by the binocular cameras, the second image in the binocular images is a left image captured by the binocular cameras. Therefore, the disparity between corresponding pixels of the second image and the first image obtained in the embodiments of the present disclosure complies with a spatial geometric law. In one implementation of the embodiments of the present disclosure, for corresponding pixel positions, in the disparity probability maps, of a pixel corresponding to a foreground object in the first image, the pixel has a larger probability value in the disparity probability map of a channel corresponding to a large disparity than in the disparity probability map of a channel corresponding to a small disparity; and for corresponding pixel positions, in the disparity probability maps, of a pixel corresponding to a background object in the first image, the pixel has a larger probability value in the disparity probability map of a channel corresponding to a small disparity than in the disparity probability map of a channel corresponding to a large disparity. For example, the first image includes a background and a face as a foreground object, then a pixel corresponding to the face has a probability value of 0.8 in the disparity probability map of a channel corresponding to a large disparity among the disparity probability maps of the N channels, and has a probability value of 0.1 in the disparity probability map of a channel corresponding to a small disparity among the disparity probability maps of the N channels; a pixel corresponding to the background has a probability value of 0.9 in the disparity probability map of a channel corresponding to a small disparity among the disparity probability maps of the N channels, and has a probability value of 0 in the disparity probability map of a channel corresponding to a large disparity among the disparity probability maps of the N channels.

In an optional example, the operation 208 may be performed by a processor by invoking a corresponding instruction stored in a memory, or may be performed by an addition unit of the image obtaining module run by the processor.

At 210, a correlation coefficient for indicating a positional relationship between pixels in one image of the binocular images and the other image of the binocular images is obtained via a second neural network.

Since a pixel in the second image can be obtained by moving a pixel in the first image in the first horizontal direction, each pixel position in the first image may be regarded as a variable, and the value of the variable is the value of a corresponding disparity in the disparity probability map, and may be 0, 1, ..., N−1, counting a total of N.A correlation coefficient between a variable of each pixel position in the first image and variables of d adjacent pixel positions in the second image is obtained and stored in the corresponding pixel position and channel, and a correlation coefficient of the positional relationship between pixels in the first image and the second image is obtained from the correlation coefficients of all pixel positions in the first image, where the value of d is an integer, for example, its value may be −40 to +40. The correlation coefficient of the positional relationship between the pixels in one image of the binocular images and the other image of the binocular images includes the correlation coefficient between the variable of each pixel positions in one image and the variables of d adjacent pixel positions in the second image, and may be expressed as a correlation coefficient map of W*H*N or a correlation coefficient matrix, where W, H, and N respectively represent the width, the height, and the number of channels of the one image, and the values of W, H, and N are all integers greater than 0.

Assuming that the one image is the left image and the other image is the right image, since the left and right images are aligned in the vertical direction, a pixel in the right image can be obtained by moving a pixel in the left image to the left in the horizontal direction. Therefore, computing the correlation coefficient of at least one pixel position in the horizontal direction contributes to better matching corresponding pixels in the left and right images in the horizontal direction.

The one image of the binocular images is the first image or the second image, and the other image is correspondingly the second image or the first image in the binocular images.

In an optional example, the operation 210 may be performed by a processor by invoking a corresponding instruction stored in a memory, or may be performed by a first obtaining unit of the stereo matching module run by the processor.

At 212, a disparity map of the first image and the second image is generated based on the other image and the correlation coefficient.

The value of at least one pixel in the disparity map respectively represents the disparity of a certain point in the scene captured in the first image, that is, the difference between the coordinates of the certain point in a coordinate system of the first image and the coordinates of the certain point in a coordinate system of the second image.

In an optional example, the operation 212 may be performed by a processor by invoking a corresponding instruction stored in a memory, or may be performed by a generation unit of the stereo matching module run by the processor.

At 214, depth information corresponding to the first image is obtained based on the disparity map.

In yet another implementation of the embodiments of the present disclosure, depth information corresponding to the first image may be obtained based on the disparity map and the camera parameter, for example, the depth information corresponding to the first image may be obtained based on the disparity map, the focal length of a camera that captures the first image, and the distance between binocular cameras corresponding to the binocular images.

For example, the depth information corresponding to the first image may be obtained by, but not limited to, the formula: $Z=f \times B/Disp$, where Disp represents a predicted disparity map, f is the focal length of the camera that captures the first image, B is the distance between the binocular cameras, and Z is a monocular global depth map to be predicted.

In an optional example, the operation 214 may be performed by a processor by invoking a corresponding instruction stored in a memory, or may be performed by a third obtaining unit of the stereo matching module run by the processor.

In the embodiments of the present disclosure, the problem of monocular depth estimation is converted into a problem of binocular stereo matching. In this way, a difficult depth estimation problem is converted into a problem of matching similar pixel points of two images, and this matching no longer requires speculating the geometric relationship between at least two pixels in a single image, thereby reducing the computational complexity. In addition, in the embodiments of the present disclosure, the use of a deep learning method may better implement the two operations of synthesis of the second image and binocular stereo matching, and by setting geometric transformation explicitly in the first neural network and the second neural network, the accuracy of the operation result is improved.

In the embodiments of the present disclosure, by using a single image to synthesize a corresponding right image and then performing binocular stereo matching, training of the first neural network and the second neural network does not require a large number of precise depth labels for supervision any longer, and it is only necessary to train the first neural network (also called an image synthesis network) using corrected binocular images that are easily obtained, and train the second neural network (also called a binocular stereo matching network) using a large number of computer rendered binocular images and a depth map. Training data overhead is reduced compared with a large number of precise depth labels.

In one implementation of the embodiments of the present disclosure, in operation 202, the processing the first image via the first neural network to output disparity probability maps may include:

performing feature extraction on the first image via network layers of two or more network depths in the first neural network respectively to obtain feature maps of two or more scales (i.e., sizes), where at least two means two or more in the present disclosure;

obtaining preliminary disparity probability maps of two or more resolutions of the N channels based on the feature maps of the two or more scales, respectively; and for each channel, enlarging the preliminary disparity probability maps of the two or more resolutions to the resolution of the first image and superimposing the enlarged preliminary disparity probability maps, to obtain the disparity probability maps of the N channels.

Because of the effect of a pooling layer in a neural network, feature maps of different sizes and resolutions are generated at different stages of the neural network, and preliminary disparity probability maps of different sizes and resolutions can be generated based on the feature maps of different sizes and resolutions, thereby contributing to providing different local information and global information for predicting depth information.

For example, the first image is a Red, Green, and Blue (RGB) image with W*H*N being 200*200*3, a feature map of 100*100*64 is obtained by a network layer of a certain network depth of the first neural network, and a feature map of 50*50*128 is obtained by a network layer of another network depth; preliminary disparity probability maps of different sizes and resolutions may be obtained based on the two feature maps of different sizes, for example, preliminary disparity probability maps of 100*100*N and 50*50*N are obtained. The resolution of the first image is 200*200, the resolutions of the two preliminary disparity probability maps are respectively 100*100 and 50*50, and the resolutions of the two preliminary disparity probability maps are respectively ½*½ and ¼*¼ of the resolution of the first image.

According to this embodiment, features extracted by network layers of two or more network depths in the first neural network are different in size. A feature extracted by a network layer with a small network depth has a small receptive field, and reflects information of a small area in the first image, and a feature extracted by a network layer with a large network depth has a large receptive field, and reflects information of a large area, or even global information, in the first image. Providing information of different fields of view while using feature maps of different resolutions may generate more accurate probability disparity maps.

In one implementation of the embodiments of the present disclosure, the operation 210 may include:

performing feature extraction on the one image and the other image respectively, for example, performing feature extraction on the one image and the other image by a convolutional neural network; and obtaining, via the second neural network, a positional relationship between pixels in the one image and the other image based on extracted features of the one image and of the other image and outputting the correlation coefficient.

Accordingly, in another implementation of the embodiments of the present disclosure, the operation 212 may include: superimposing the feature of the other image and the correlation coefficient to generate the disparity map of the first image and the second image. In this way, a disparity map of a scene, captured in a single image, in binocular images can be obtained based on the single image, a difficult depth estimation problem is converted into a problem of matching similar pixel points of two images, and this matching no longer requires speculating the geometric relationship between at least two pixels in a single image, thereby reducing the computational complexity. In addition, in this embodiment, the use of a deep learning method improves the accuracy of the operation result by setting geometric transformation explicitly in the second neural network.

According to some embodiments, in yet another implementation of the embodiments of the present disclosure, the operation 212 may include: superimposing the feature of the other image and the correlation coefficient to obtain a superimposition result, which may be, for example, a feature map; and extracting a feature of the superimposition result, and merging the extracted feature of the superimposition result with the superimposition result to obtain the disparity map of the first image and the second image.

In one implementation, the feature of the superimposition result may be extracted by a convolutional neural network, which may for instance include, but is not limited to, a convolutional layer and an activation layer (ReLu). The convolutional neural network may be implemented, for example, by an encoding-decoding model, the feature of the superimposition result is extracted by the convolution layer to obtain a feature map of the same size as the superimposition result, and the feature map is merged (concat) with the superimposition result to obtain the disparity map of the first image and the second image.

In the embodiments of the present disclosure, by further extracting a feature of the superimposition result, the range of the receptive field can be increased, and then the extracted feature of the superimposition result is merged with the superimposition result to obtain the disparity map of the first image and the second image, and thus, more information can be merged in the disparity map, and more global information can be obtained, thereby contributing to improving subsequent prediction of depth information corresponding to the first image.

Figure 3:
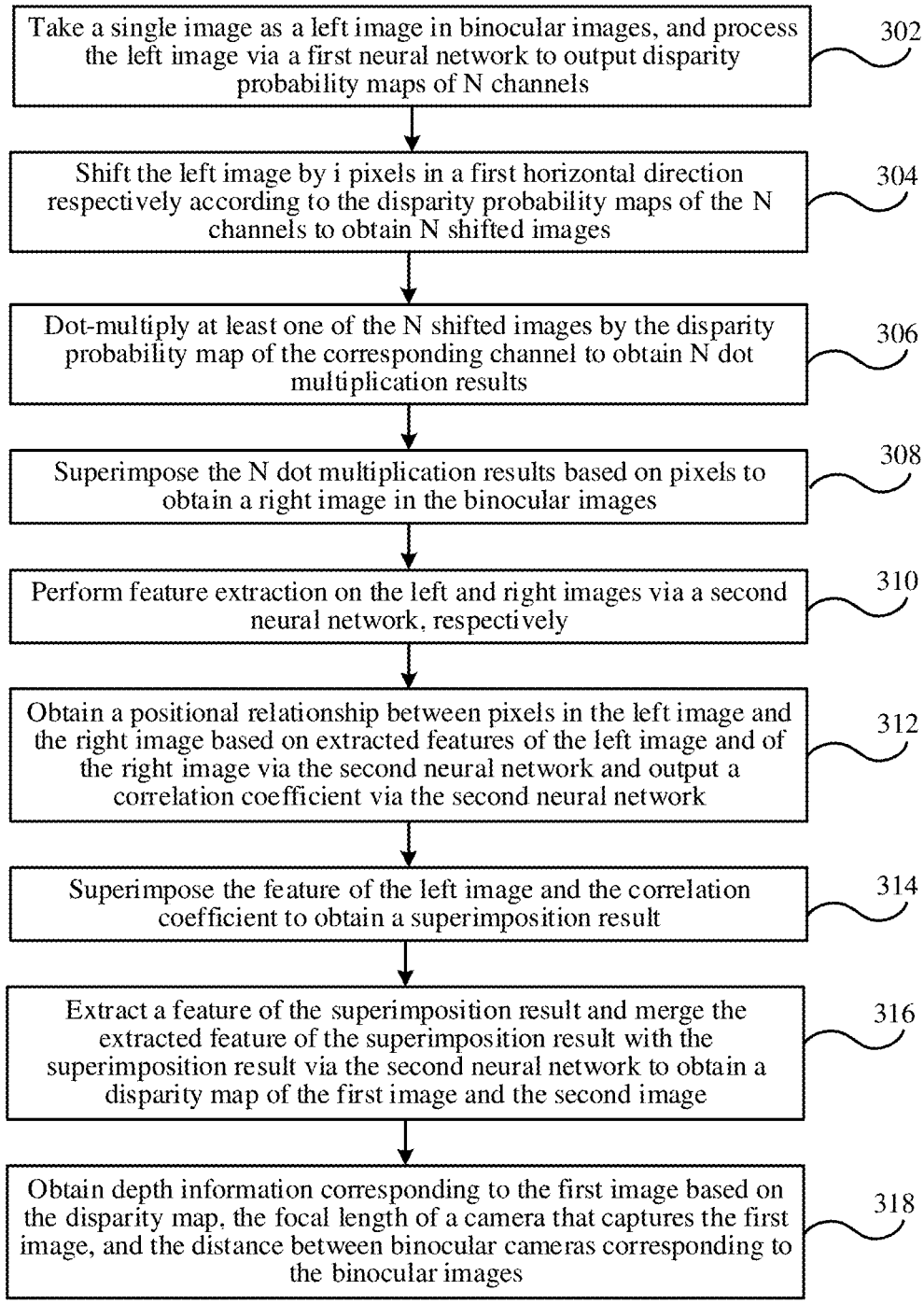
FIG. 3 is a flowchart of an application embodiment of a depth estimation method according to the present disclosure.
Figure 4:
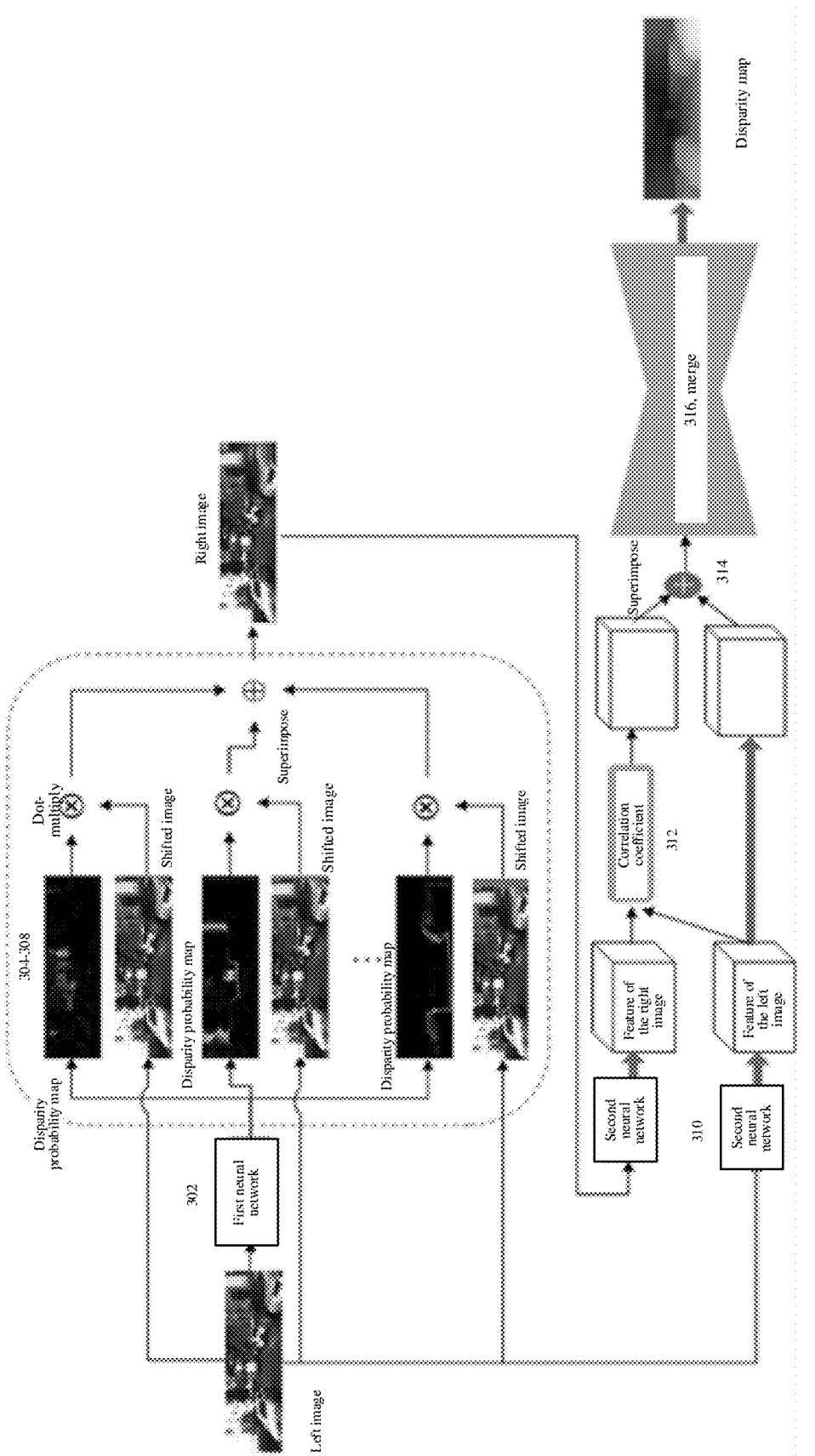
FIG. 4 is an exemplary block diagram corresponding to the embodiment shown in FIG. 3.

FIG. 3 is a flowchart of an application embodiment of a depth estimation method according to the present disclosure. FIG. 4 is an exemplary block diagram corresponding to the embodiment shown in FIG. 3. In the application embodiment, description is made by respectively using a left image and a right image as the first image and the second image in at least one of the foregoing embodiments of the present disclosure. Referring to FIGS. 3 and 4, the application embodiment includes the following operations.

At 302, a single image is taken as a left image in binocular images, and the left image is processed via a first neural network to output disparity probability maps of N channels.

Each channel represents a probability of a pixel on the left image being horizontally shifted to the left by i disparities, where i=0, 1, . . . , N−1, and N is an integer greater than 1. In an optional example, the operation 302 may be performed by a processor by invoking a corresponding instruction stored in a memory, or may be performed by the first sub-neural network unit of the image obtaining module run by the processor.

At 304, the left image is shifted by i pixels in a first horizontal direction respectively according to the disparity probability maps of the N channels to obtain N shifted images.

In an optional example, the operation 304 may be performed by a processor by invoking a corresponding instruction stored in a memory, or may be performed by the shift unit of the image obtaining module run by the processor.

At 306, each of the N shifted images is dot-multiplied by the disparity probability map of the corresponding channel to obtain N dot multiplication results.

In an optional example, the operation 306 may be performed by a processor by invoking a corresponding instruction stored in a memory, or may be performed by the dot multiplication unit of the image obtaining module run by the processor.

At 308, the N dot multiplication results are superimposed based on pixels to obtain a right image in the binocular images.

In an optional example, the operation 308 may be performed by a processor by invoking a corresponding instruction stored in a memory, or may be performed by the addition unit of the image obtaining module run by the processor.

At 310, feature extraction is respectively performed on the left and right images via the second neural network.

In an optional example, the operation 310 may be performed by a processor by invoking a corresponding instruction stored in a memory, or may be performed by a second sub-neural network unit of the first obtaining unit of the stereo matching module run by the processor.

At 312, a positional relationship between pixels in the left image and the right image is obtained based on extracted features of the left image and of the right image via the second neural network and a correlation coefficient is output via the second neural network.

In an optional example, the operation 312 may be performed by a processor by invoking a corresponding instruction stored in a memory, or may be performed by an obtaining subunit of the first obtaining unit of the stereo matching module run by the processor.

At 314, the feature of the left image and the correlation coefficient are superimposed to obtain a superimposition result, which may be, for example, a feature map.

According to some embodiments, in order to obtain a disparity map aligned with pixels of the left image, further feature extraction may be first performed by a neural network on the feature map obtained from the left image, and an extracted feature and the correlation coefficient are superimposed, where the neural network may exemplarily consist of a convolutional layer and an activation layer. By performing further feature extraction on the feature map obtained from the left image, the range of the receptive field can be increased, and a further processed feature map is obtained and then superimposed on the correlation coefficient, so that more global information can be included in the superimposition result, thereby improving the accuracy of a disparity map and depth information to be subsequently obtained.

In an optional example, the operation 314 may be performed by a processor by invoking a corresponding instruction stored in a memory, or may be performed by a superimposition subunit of the generation unit of the stereo matching module run by the processor.

At 316, a feature of the superimposition result is extracted and merged with the superimposition result via the second neural network to obtain a disparity map of the first image and the second image.

In an optional example, the operation 316 may be performed by a processor by invoking a corresponding instruction stored in a memory, or may be performed by a merging subunit of the generation unit of the stereo matching module run by the processor.

At 318, depth information corresponding to the first image is obtained based on the disparity map, the focal length of the camera that captures the first image, and the distance between binocular cameras corresponding to the binocular images.

In an optional example, the operation 318 may be performed by a processor by invoking a corresponding instruction stored in a memory, or may be performed by the third obtaining unit of the stereo matching module run by the processor.

Based on at least one of the foregoing embodiments of the present disclosure, after obtaining the depth information, a 3D spatial scene of the scene in the first image may also be obtained based on the depth information corresponding to the first image and the second image.

The embodiments of the present disclosure may be applied, for example, but not limited to, in the following:

1. performing global depth estimation on a single image; and that 2. the embodiments of the present disclosure may be applied to 3D scene reconstruction, and predicted depth information (also referred to as a global depth map) corresponding to a first image may be applied to various scenes, such as autonomous driving, 3D scene recovery, 3D movie production, and the like. By the embodiments of the present disclosure, only a single image is needed to obtain a better effect, thereby reducing the costs.

Using predicted depth information corresponding to a first image in combination with a synthesized right image, the 3D spatial scene of the entire scene in the original image (i.e., the first image) may be recovered, and the recovered 3D spatial scene can be applied in many scenarios, such as 3D movies, autonomous driving, and the like.

According to some embodiments, in at least one of the foregoing embodiments of the present disclosure, the first neural network may be pre-trained by using sample binocular images in a first sample set, the first sample set including at least one group of first sample binocular images; and/or, the second neural network may be pre-trained by using sample binocular images in a second sample set.

Correspondingly, before at least one of the foregoing embodiments of the present disclosure, the method may further include:

training the first neural network by using sample binocular images in a first sample set, and training the second neural network by using sample binocular images in a second sample set and a depth map, where the first sample set includes at least one group of first sample binocular images, each group of first sample binocular images includes a first image and a second image, and the second sample set includes at least one group of second sample binocular images and a disparity map label.

In one implementation, the training the first neural network by using sample binocular images in a first sample set may include:

obtaining and outputting, via the first neural network, a second image in the at least one group of first sample binocular images according to a first image in the at least one group of first sample binocular images; and obtaining a first difference between the second image output via the first neural network and the second image in the at least one group of first sample binocular images, and training the first neural network based on the first difference until a first training completion condition is satisfied.

In an optional example, the obtaining a first difference between the second image output via the first neural network and the second image in the at least one group of first sample binocular images, and training the first neural network based on the first difference until a first training completion condition is satisfied may include:

obtaining the first difference in pixels between the second image output via the first neural network and the second image in the at least one group of first sample binocular images, for example, the sum of the absolute values of differences in pixels; and adjusting the parameter value of a network parameter in the first neural network based on the first difference until the first training completion condition is satisfied.

The first training completion condition may for example include, but not limited to, that: the first difference is less than a first preset threshold, and/or the number of times of training of the first neural network reaches a first preset number of times.

In another implementation, the training the second neural network by using sample binocular images in a second sample set and a disparity map label may include:

obtaining and outputting a disparity map of the at least one group of second sample binocular images via the second neural network; and obtaining a second difference between the disparity map output via the second neural network and the disparity map label of the at least one group of second sample binocular images, and training the second neural network based on the second difference until a second training completion condition is satisfied.

In an optional example, the obtaining a second difference between the disparity map output via the second neural network and the disparity map label of the at least one group of second sample binocular images, and training the second neural network based on the second difference until a second training completion condition is satisfied may include:

obtaining the second difference in pixels between the disparity map output via the second neural network and the disparity map label of the at least one group of second sample binocular images, for example, the sum of the absolute values of differences in pixels; and adjusting the parameter value of a network parameter in the second neural network based on the second difference until the second training completion condition is satisfied.

The second training completion condition may for example include, but not limited to, that: the second difference is less than a second preset threshold, and/or the number of times of training of the second neural network reaches a second preset number of times.

Since an actually acquired depth map label is not easy to obtain, the second neural network may be trained using computer-synthesized left image, right image, and depth map label as second sample binocular images in the second sample set and a depth map label corresponding to a second sample image in practical applications based on the embodiments of the present disclosure.

In addition, after the phased training of the first neural network and the second neural network is completed in the foregoing embodiment of the present disclosure, the method may further include:

training the first neural network and the second neural network by using sample binocular images in a third sample set and a depth map label corresponding to third sample images.

The third sample set includes at least one group of third sample binocular images and the depth map label corresponding to the third sample images.

In one implementation, the training the first neural network and the second neural network by using sample binocular images in a third sample set and a depth map label corresponding to third sample images may include:

obtaining a second image in the at least one group of third sample binocular images according to a first image in the at least one group of third sample binocular images via the first neural network;

obtaining a disparity map of the at least one group of third sample binocular images via the second neural network;

obtaining at least one group of depth information based on the disparity map of the at least one group of third sample binocular images;

obtaining a third difference between the at least one group of depth information and the depth map label of the at least one group of third sample binocular images, where the third difference may be, for example, the sum of the absolute values of differences in pixels; and adjusting the parameter values of network parameters in the first neural network and the second neural network based on the third difference until a third training completion condition is satisfied.

The third training completion condition may for example include, but not limited to, that: the third difference is less than a third preset threshold, and/or the number of times of training of the first neural network and the second neural network reaches a third preset number of times.

Any depth estimation method provided by the embodiments of the present disclosure may be executed by any appropriate device having data processing capability, including, but not limited to, a terminal device and a server. Alternatively, any depth estimation method provided in the embodiments of the present disclosure may be executed by a processor, for example, any depth estimation method mentioned in the embodiments of the present disclosure is executed by the processor by invoking a corresponding instruction stored in a memory. Details are not described below again.

A person of ordinary skill in the art may understand that all or some operations for implementing the foregoing method embodiments may be achieved by a program by instructing related hardware; the foregoing program can be stored in a computer-readable storage medium; when the program is executed, operations including the foregoing method embodiments are executed. Moreover, the foregoing storage medium includes various media capable of storing a program code such as an ROM, an RAM, a magnetic disk, or an optical disk.

Figure 5:
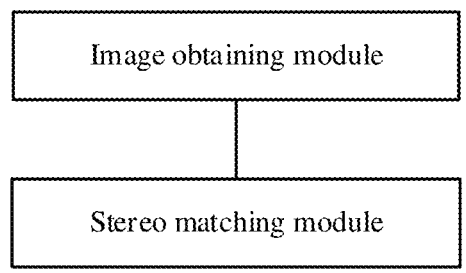
FIG. 5 is a schematic structural diagram of an embodiment of a depth estimation apparatus according to the present disclosure.

FIG. 5 is a schematic structural diagram of an embodiment of a depth estimation apparatus according to the present disclosure. The depth estimation apparatus of this embodiment may be used for implementing at least one of the foregoing embodiments of the depth estimation method according to the present disclosure. As shown in FIG. 5, the depth estimation apparatus of this embodiment includes: an image obtaining module and a stereo matching module.

The image obtaining module is configured to take a single image as a first image in binocular images, and obtain a second image in the binocular images based on the first image via a first neural network.

The stereo matching module is configured to obtain depth information corresponding to the first image via a second neural network by performing binocular stereo matching on the first image and the second image.

Based on the depth estimation apparatus provided by the above embodiment of the present disclosure, a single image is taken as a first image in binocular images, and a second image in the binocular images is obtained based on the first image via a first neural network; and depth information corresponding to the first image is obtained via a second neural network by performing binocular stereo matching on the first image and the second image. Thus, depth estimation of the scene in a single image is implemented based on the single image without needing binocular cameras, thereby avoiding additional hardware overhead generated by binocular cameras and reducing the costs. Moreover, an error in obtained depth information caused by the inaccuracy of settings of binocular cameras can be avoided, and the accuracy of depth estimation is improved.

Figure 6:
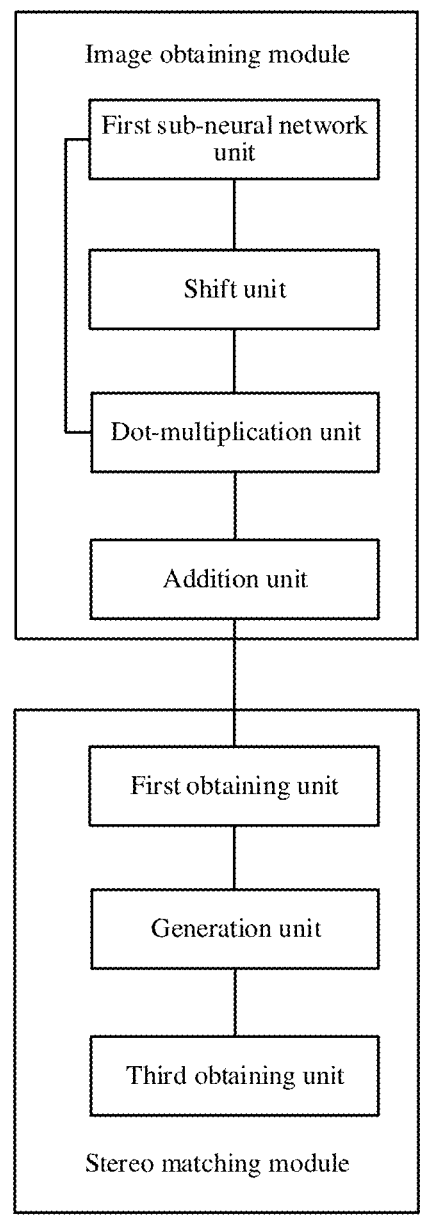
FIG. 6 is a schematic structural diagram of another embodiment of a depth estimation apparatus according to the present disclosure.

FIG. 6 is a schematic structural diagram of another embodiment of a depth estimation apparatus according to the present disclosure. As shown in FIG. 6, in one implementation of at least one embodiment of the present disclosure, the image obtaining module includes: a first sub-neural network unit, a shift unit, a dot multiplication unit, and an addition unit.

The first sub-neural network unit is configured to process the first image to output disparity probability maps of N channels, where the disparity probability map of each channel represents a probability of a pixel on the first image being shifted by i disparities in a first horizontal direction, where i=0, 1, . . . , N−1, and N is an integer greater than 1.

The shift unit is configured to shift the first image by i pixels in the first horizontal direction respectively according to the disparity probability maps of the N channels to obtain N shifted images.

The dot multiplication unit is configured to dot-multiply each of the N shifted images by the disparity probability map of the corresponding channel to obtain N dot multiplication results.

The addition unit is configured to superimpose the N dot multiplication results based on pixels to obtain the second image.

In one optional example, the first sub-neural network unit includes network layers of two or more network depths, and is configured to: perform feature extraction on the first image via the network layers of the two or more network depths respectively to obtain feature maps of two or more scales; obtain preliminary disparity probability maps of two or more resolutions of the N channels based on the feature maps of the two or more scales, respectively; and for each channel, enlarge the preliminary disparity probability maps of the two or more resolutions to the resolution of the first image and superimpose the enlarged preliminary disparity probability maps, to obtain the disparity probability maps of the N channels.

According to some embodiments, for a corresponding pixel position, in the disparity probability maps of the N channels, of a pixel corresponding to a foreground object in the first image, the pixel has a larger probability value in the disparity probability map of a channel corresponding to a large disparity than in the disparity probability map of a channel corresponding to a small disparity; and for a corresponding pixel position, in the disparity probability maps of the N channels, of a pixel corresponding to a background object in the first image, the pixel has a larger probability value in the disparity probability map of a channel corresponding to a small disparity than in the disparity probability map of a channel corresponding to a large disparity.

In addition, referring to FIG. 6 again, in another implementation of at least one embodiment of the present disclosure, the stereo matching module includes: a first obtaining unit, a generation unit, and a third obtaining unit.

The first obtaining unit is configured to obtain a correlation coefficient for indicating a positional relationship between pixels in one image of the binocular images and the other image of the binocular images, where the one image of the binocular images is the first image or the second image, and the other image is correspondingly the second image or the first image.

The generation unit is configured to generate a disparity map of the first image and the second image based on the other image and the correlation coefficient.

The third obtaining unit is configured to obtain the depth information corresponding to the first image based on the disparity map.

In one optional example, the first obtaining unit includes: a second sub-neural network unit, configured to perform feature extraction on the one image and the other image respectively; and an obtaining subunit, configured to obtain the positional relationship between the pixels in the one image and the other image based on extracted features of the one image and of the other image, and output the correlation coefficient for indicating the positional relationship between the pixels in the one image of the binocular images and the other image of the binocular images.

Correspondingly, in another optional example, the generation unit is configured to superimpose the feature of the other image and the correlation coefficient to generate the disparity map of the first image and the second image.

In another optional example, the generation unit includes: a superimposition subunit, configured to superimpose the feature of the other image and the correlation coefficient to obtain a superimposition result; and a merging subunit, configured to extract a feature of the superimposition result, and merge the extracted feature of the superimposition result with the superimposition result to obtain the disparity map of the first image and the second image.

In still another optional example, the third obtaining unit is configured to obtain the depth information corresponding to the first image based on the disparity map, the focal length of a camera that captures the first image, and the distance between binocular cameras corresponding to the binocular images.

In addition, the depth estimation apparatus according to at least one of the foregoing embodiments of the present disclosure may further include: an obtaining module, configured to obtain a 3D spatial scene of the scene in the first image based on the depth information corresponding to the first image and the second image.

Figure 7:
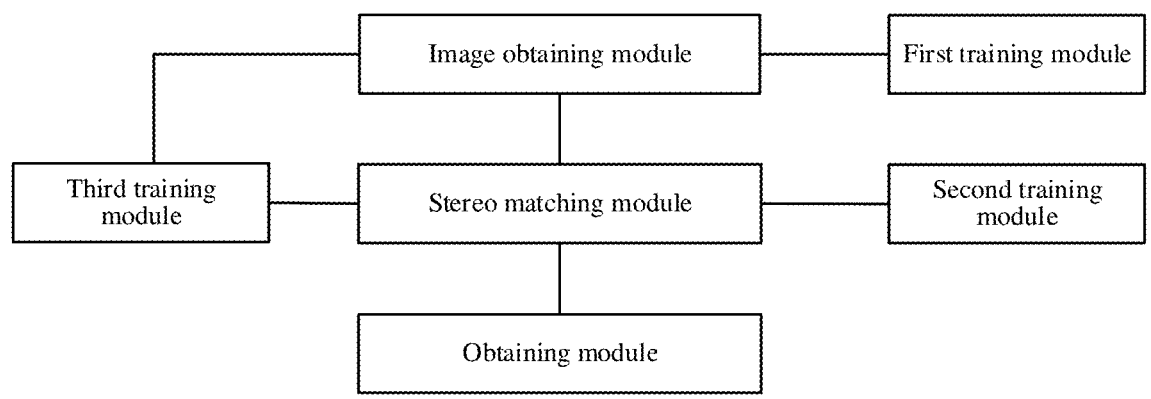
FIG. 7 is a schematic structural diagram of still another embodiment of a depth estimation apparatus according to the present disclosure.

FIG. 7 is a schematic structural diagram of still another embodiment of a depth estimation apparatus according to the present disclosure. In FIG. 7, the image obtaining module and the stereo matching module may be selectively implemented by the structure in any embodiment shown in FIG. 6, or may be implemented by other structures.

In addition, in the depth estimation apparatus according to at least one of the foregoing embodiments of the present disclosure, the first neural network may be pre-trained by using sample binocular images in a first sample set, the first sample set including at least one group of first sample binocular images; and/or the second neural network may be pre-trained by using sample binocular images in a second sample set, the second sample set including at least one group of second sample binocular images and a disparity map label.

Referring to FIG. 7 again, in yet another embodiment of the depth estimation apparatus according to the present disclosure, a first training module is further included. In this embodiment, the first neural network is configured to obtain and output a second image in the at least one group of first sample binocular images according to a first image in the at least one group of first sample binocular images. The first training module is configured to obtain a first difference between the second image output via the first neural network and the second image in the at least one group of first sample binocular images, and train the first neural network based on the first difference until a first training completion condition is satisfied.

In one implementation, the first training module is configured to: obtain the first difference in pixels between the second image output via the first neural network and the second image in the at least one group of first sample binocular images; and adjust the parameter value of a network parameter in the first neural network based on the first difference until the first training completion condition is satisfied, where the first training completion condition may for example include, but not limited to, that: the first difference is less than a first preset threshold, and/or the number of times of training of the first neural network reaches a first preset number of times.

Referring to FIG. 7 again, in yet another embodiment of the depth estimation apparatus according to the present disclosure, a second training module is further included. In this embodiment, the second neural network is configured to obtain and output a disparity map of the at least one group of second sample binocular images. The second training module is configured to obtain a second difference between the disparity map output via the second neural network and the disparity map label of the at least one group of second sample binocular images, and train the second neural network based on the second difference until a second training completion condition is satisfied.

In one implementation, the second training module is specifically configured to: obtain the first difference in pixels between the second image output via the first neural network and the second image in the at least one group of first sample binocular images; and adjust the parameter value of a network parameter in the second neural network based on the second difference until the second training completion condition is satisfied, where the second training completion condition may for example include, but not limited to, that: the second difference is less than a second preset threshold, and/or the number of times of training of the second neural network reaches a second preset number of times.

Further referring to FIG. 7 again, in yet another embodiment of the depth estimation apparatus according to the present disclosure, a third training module is further included, and configured to train the first neural network and the second neural network by using sample binocular images in a third sample set and a depth map label corresponding to third sample images. The third sample set includes at least one group of third sample binocular images and the depth map label corresponding to the third sample images.

In one implementation, the first neural network is configured to obtain a second image in the at least one group of third sample binocular images according to a first image in the at least one group of third sample binocular images; and the second neural network is configured to obtain a disparity map of the at least one group of third sample binocular images.

The third training module is configured to: obtain at least one group of depth information based on the disparity map of the at least one group of third sample binocular images; obtain a third difference between the at least one group of depth information and the depth map label of the at least one group of third sample binocular images; and adjust the parameter values of network parameters in the first neural network and the second neural network based on the third difference until a third training completion condition is satisfied. The third training completion condition may for example include, but not limited to, that: the third difference is less than a third preset threshold, and/or the number of times of training of the first neural network and the second neural network reaches a third preset number of times. For the technical effects of at least one solution in the embodiments of the depth estimation apparatus according to the present disclosure, reference may be made to corresponding description in the corresponding method embodiments, and details are not described herein again.

In addition, an electronic device provided in the embodiments of the present disclosure includes:

a memory, configured to store executable instructions; and a processor, configured to communicate with the memory to execute the executable instructions so as to perform the operations of the depth estimation method according to any one of the forgoing embodiments of the present disclosure.

Figure 8:
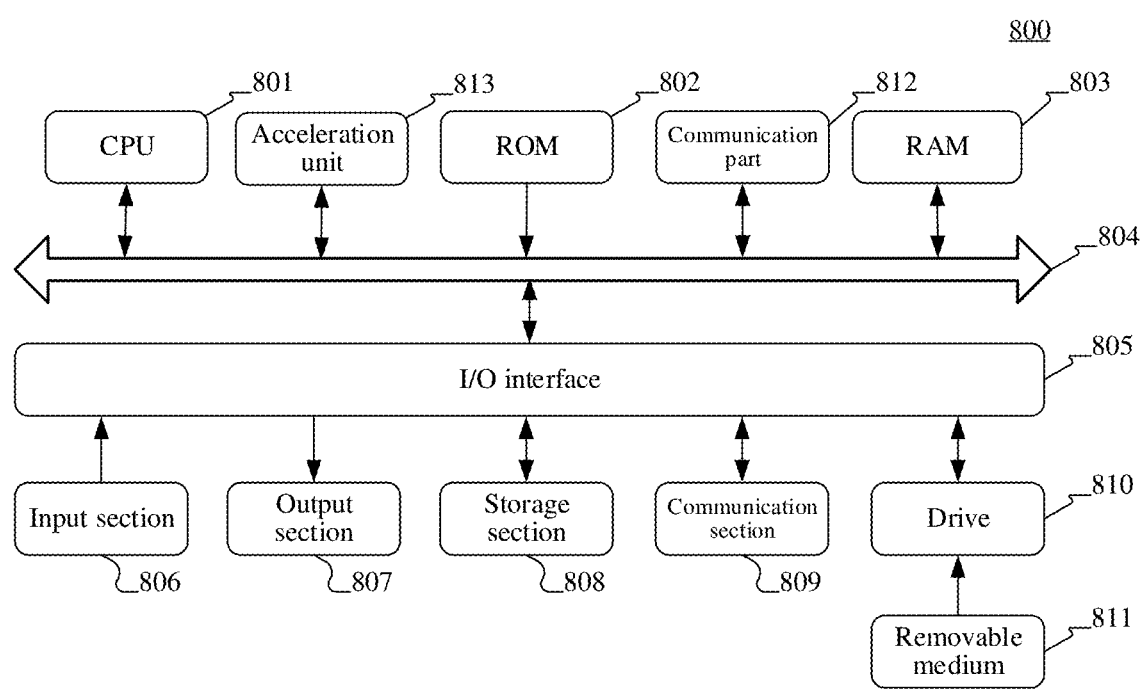
FIG. 8 is a schematic structural diagram of an application embodiment of an electronic device according to the present disclosure.

FIG. 8 is a schematic structural diagram of an application embodiment of an electronic device according to the present disclosure. Referring to FIG. 8 below, a schematic structural diagram of an electronic device, which may be a terminal device or a server, suitable for implementing the embodiments of the present disclosure is shown. As shown in FIG. 8, the electronic device includes one or more processors, a communication part, and the like. The one or more processors are, for example, one or more Central Processing Units (CPUs) 801, and/or one or more acceleration units (GPUs) 813, or the like. The acceleration unit 813 includes, but is not limited to, a GPU, an FPGA, and other types of special-purpose processors. The processor performs various appropriate actions and processing according to executable instructions stored in a Read-Only Memory (ROM) 802 or executable instructions loaded from a storage section 808 to a Random Access Memory (RAM) 803. The communication part 812 may include, but is not limited to, a network card. The network card may include, but is not limited to, an Infiniband (IB) network card. The processor may communicate with the ROM 802 and/or the RAM 803, to execute executable instructions. The processor is connected to the communication part 812 via a bus 804, and communicates with other target devices via the communication part 812, thereby implementing corresponding operations of any method provided in the embodiments of the present disclosure, for example, taking a single image as a first image in binocular images, and obtaining a second image in the binocular images based on the first image via a first neural network; and obtaining depth information corresponding to the first image via a second neural network by performing binocular stereo matching on the first image and the second image.

For the technical effects of solutions of the electronic device according to the present disclosure, reference may be made to corresponding description in the corresponding method embodiments, and details are not described herein again.

In addition, the RAM 803 further stores programs and data required for operations of an apparatus. The CPU 801, the ROM 802, and the RAM 803 are connected to each other by means of the bus 804. In the presence of the RAM 803, the ROM 802 is an optional module. The RAM 803 stores executable instructions, or writes the executable instructions into the ROM 802 during running, where the executable instructions cause the processor to execute corresponding operations of any method of the present disclosure. An Input/Output (I/O) interface 805 is also connected to the bus 804. The communication part 812 is integrated, or is configured to have multiple sub-modules (for example, multiple IB network cards) connected to the bus.

The following components are connected to the I/O interface 805: an input section 806 including a keyboard, a mouse and the like; an output section 807 including a Cathode-Ray Tube (CRT), a Liquid Crystal Display (LCD), a speaker and the like; the storage section 808 including a hard disk drive and the like; and a communication section 809 of a network interface card including an LAN card, a modem and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that, the architecture shown in FIG. 8 is merely an optional implementation. During specific practice, the number and types of the components in FIG. 8 may be selected, decreased, increased, or replaced according to actual requirements. Different functional components may be separated or integrated or the like. For example, the acceleration unit 813 and the CPU 801 may be separated, or the acceleration unit 813 may be integrated on the CPU 801, and the communication part 812 may be separated from or integrated on the CPU 801 or the acceleration unit 813 or the like. These alternative implementations all fall within the scope of protection of the present disclosure.

Particularly, a process described above with reference to a flowchart according to the embodiments of the present disclosure may be implemented as a computer software program. For example, the embodiments of this disclosure include a computer program product. The computer program product includes a computer program tangibly included in a machine-readable medium. The computer program includes a program code for performing a method shown in the flowcharts. The program code may include instructions for performing operations of the depth estimation method provided in the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiments of the present disclosure further provide a computer program, including a computer-readable code, where when the computer-readable code runs in a device, a processor in the device executes instructions for implementing the operations of the depth estimation method according to any one of the embodiments of the present disclosure.

In addition, the embodiments of the present disclosure further provide a computer-readable storage medium configured to store computer-readable instructions, where when the instructions are executed, the operations of the depth estimation method according to any one of the embodiments of the present disclosure are executed.

A person of ordinary skill in the art may understand that all or some operations for implementing the foregoing method embodiments are achieved by a program by instructing related hardware; the foregoing program can be stored in a computer-readable storage medium;

when the program is executed, operations including the foregoing method embodiments are executed. Moreover, the foregoing storage medium includes various media capable of storing a program code such as an ROM, an RAM, a magnetic disk, or an optical disk.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure may be implemented in many manners. For example, the methods and apparatuses of the present disclosure are implemented with software, hardware, firmware, or any combination of software, hardware, and firmware. The foregoing sequence of the operations of the method is merely for description, and unless otherwise stated particularly, the operations of the method in the present disclosure are not limited to the specifically described sequence. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A depth estimation method, comprising:
    taking a single image as a first image in binocular images, and obtaining a second image in the binocular images based on the first image via a first neural network; and
    obtaining depth information corresponding to the first image via a second neural network by performing binocular stereo matching on the first image and the second image,
    wherein the obtaining a second image in the binocular images based on the first image via a first neural network comprises:
        processing the first image via the first neural network to output disparity probability maps of N channels, wherein the disparity probability map of each channel represents a probability of a pixel on the first image being shifted by i disparities in a first horizontal direction, wherein i=0, 1, ..., N−1, and N is an integer greater than 1;
        shifting the first image by i pixels in the first horizontal direction respectively according to the disparity probability maps of the N channels to obtain N shifted images;
        dot-multiplying each of the N shifted images by the disparity probability map of the corresponding channel to obtain N dot multiplication results; and
        superimposing the N dot multiplication results based on pixels to obtain the second image.

2. The method according to claim 1, wherein the processing the first image via the first neural network to output disparity probability maps of N channels comprises:
    performing feature extraction on the first image via network layers of at least two network depths in the first neural network respectively to obtain feature maps of at least two scales;
    obtaining preliminary disparity probability maps of at least two resolutions of the N channels based on the feature maps of the at least two scales, respectively; and
    for each channel, enlarging the preliminary disparity probability maps of the at least two resolutions to a resolution of the first image and superimposing the enlarged preliminary disparity probability maps, to obtain the disparity probability maps of the N channels.

3. The method according to claim 1, wherein for a corresponding pixel position, in the disparity probability maps of the N channels, of a pixel corresponding to a foreground object in the first image, the pixel has a larger probability value in the disparity probability map of a channel corresponding to a large disparity than in the disparity probability map of a channel corresponding to a small disparity; and for a corresponding pixel position, in the disparity probability maps of the N channels, of a pixel corresponding to a background object in the first image, the pixel has a larger probability value in the disparity probability map of a channel corresponding to a small disparity than in the disparity probability map of a channel corresponding to a large disparity.

4. The method according to claim 1, wherein the obtaining depth information corresponding to the first image via a second neural network by performing binocular stereo matching on the first image and the second image comprises:
    obtaining a correlation coefficient for indicating a positional relationship between pixels in one image of the binocular images and the other image of the binocular images, wherein the one image of the binocular images is the first image or the second image, and the other image is correspondingly the second image or the first image;
    generating a disparity map of the first image and the second image based on the other image and the correlation coefficient; and
    obtaining the depth information corresponding to the first image based on the disparity map.

5. The method according to claim 4, wherein the obtaining a correlation coefficient for indicating a positional relationship between pixels in one image of the binocular images and the other image of the binocular images comprises:
    performing feature extraction on the one image and the other image respectively; and
    obtaining the positional relationship between the pixels in the one image and the other image based on extracted features of the one image and of the other image, and outputting the correlation coefficient for indicating the positional relationship between the pixels in the one image of the binocular images and the other image of the binocular images.

6. The method according to claim 5, wherein the generating a disparity map of the first image and the second image based on the other image and the correlation coefficient comprises:
    superimposing the feature of the other image and the correlation coefficient to generate the disparity map of the first image and the second image.

7. The method according to claim 6, wherein the superimposing the feature of the other image and the correlation coefficient to generate the disparity map of the first image and the second image comprises:
    superimposing the feature of the other image and the correlation coefficient to obtain a superimposition result; and
    extracting a feature of the superimposition result, and merging the extracted feature of the superimposition result with the superimposition result to obtain the disparity map of the first image and the second image.

8. The method according to claim 5, wherein the obtaining the depth information corresponding to the first image based on the disparity map comprises:
    obtaining the depth information corresponding to the first image based on the disparity map, a focal length of a camera that captures the first image, and a distance between binocular cameras corresponding to the binocular images.

9. The method according to claim 1, further comprising:
    obtaining a three-dimensional (3D) spatial scene of a scene in the first image based on the depth information corresponding to the first image and the second image.

10. The method according to claim 4, wherein at least one of:
    the first neural network is pre-trained by using sample binocular images in a first sample set, the first sample set comprising at least one group of first sample binocular images; or
    the second neural network is pre-trained by using sample binocular images in a second sample set, the second sample set comprising at least one group of second sample binocular images and a disparity map label.

11. The method according to claim 10, wherein training of the first neural network comprises:
    obtaining and outputting, via the first neural network, a second image in the at least one group of first sample binocular images according to a first image in the at least one group of first sample binocular images; and
    obtaining a first difference between the second image output via the first neural network and the second image in the at least one group of first sample binocular images, and training the first neural network based on the first difference until a first training completion condition is satisfied.

12. The method according to claim 11, wherein the obtaining a first difference between the second image output via the first neural network and the second image in the at least one group of first sample binocular images, and training the first neural network based on the first difference until a first training completion condition is satisfied comprises:
    obtaining the first difference in pixels between the second image output via the first neural network and the second image in the at least one group of first sample binocular images; and
    adjusting a parameter value of a network parameter in the first neural network based on the first difference until the first training completion condition is satisfied,
    wherein the first training completion condition comprises that at least one of: the first difference is less than a first preset threshold, or a number of times of training of the first neural network reaches a first preset number of times.

13. The method according to claim 10, wherein training of the second neural network comprises:
    obtaining and outputting a disparity map of the at least one group of second sample binocular images via the second neural network; and
    obtaining a second difference between the disparity map output via the second neural network and the disparity map label of the at least one group of second sample binocular images, and training the second neural network based on the second difference until a second training completion condition is satisfied.

14. The method according to claim 13, wherein the obtaining a second difference between the disparity map output via the second neural network and the disparity map label of the at least one group of second sample binocular images, and training the second neural network based on the second difference until a second training completion condition is satisfied comprises:
    obtaining the second difference in pixels between the disparity map output via the second neural network and the disparity map label of the at least one group of second sample binocular images; and
    adjusting a parameter value of a network parameter in the second neural network based on the second difference until the second training completion condition is satisfied,
    wherein the second training completion condition comprises that at least one of: the second difference is less than a second preset threshold, or a number of times of training of the second neural network reaches a second preset number of times.

15. The method according to claim 10, wherein training of the first neural network and the second neural network comprises:
    training the first neural network and the second neural network by using sample binocular images in a third sample set and a depth map label corresponding to third sample images,
    wherein the third sample set comprises at least one group of third sample binocular images and the depth map label corresponding to the third sample images.

16. The method according to claim 15, wherein the training the first neural network and the second neural network by using sample binocular images in a third sample set and a depth map label corresponding to third sample images comprises:
    obtaining a second image in the at least one group of third sample binocular images according to a first image in the at least one group of third sample binocular images via the first neural network;
    obtaining a disparity map of the at least one group of third sample binocular images via the second neural network;
    obtaining at least one group of depth information based on the disparity map of the at least one group of third sample binocular images;
    obtaining a third difference between the at least one group of depth information and the depth map label of the at least one group of third sample binocular images; and adjusting parameter values of network parameters in the first neural network and the second neural network based on the third difference until a third training completion condition is satisfied, wherein the third training completion condition comprises that at least one of: the third difference is less than a third preset threshold, or a number of times of training of the first neural network and the second neural network reaches a third preset number of times.

17. A depth estimation apparatus, comprising:
a memory storing processor-executable instructions; and
a processor arranged to execute the stored processor-executable instructions to perform operations of:
   taking a single image as a first image in binocular images, and obtaining a second image in the binocular images based on the first image via a first neural network; and
   obtaining depth information corresponding to the first image via a second neural network by performing binocular stereo matching on the first image and the second image,
   wherein the obtaining a second image in the binocular images based on the first image via a first neural network comprises:
      processing the first image via the first neural network to output disparity probability maps of N channels, wherein the disparity probability map of each channel represents a probability of a pixel on the first image being shifted by i disparities in a first horizontal direction, wherein i=0, 1, . . . , N−1, and N is an integer greater than 1;
      shifting the first image by i pixels in the first horizontal direction respectively according to the disparity probability maps of the N channels to obtain N shifted images;
      dot-multiplying each of the N shifted images by the disparity probability map of the corresponding channel to obtain N dot multiplication results; and
      superimposing the N dot multiplication results based on pixels to obtain the second image.

18. A non-transitory computer-readable storage medium having stored thereon computer-readable instructions that, when executed by a processor, cause the processor to perform a depth estimation method, the method comprising:
   taking a single image as a first image in binocular images, and obtaining a second image in the binocular images based on the first image via a first neural network; and
   obtaining depth information corresponding to the first image via a second neural network by performing binocular stereo matching on the first image and the second image,
   wherein the obtaining a second image in the binocular images based on the first image via a first neural network comprises:
      processing the first image via the first neural network to output disparity probability maps of N channels, wherein the disparity probability map of each channel represents a probability of a pixel on the first image being shifted by i disparities in a first horizontal direction, wherein i=0, 1, . . . , N−1, and N is an integer greater than 1;
      shifting the first image by i pixels in the first horizontal direction respectively according to the disparity probability maps of the N channels to obtain N shifted images;
      dot-multiplying each of the N shifted images by the disparity probability map of the corresponding channel to obtain N dot multiplication results; and
      superimposing the N dot multiplication results based on pixels to obtain the second image.

19. The apparatus according to claim 17, wherein the processing the first image via the first neural network to output disparity probability maps of N channels comprises:
   performing feature extraction on the first image via network layers of at least two network depths in the first neural network respectively to obtain feature maps of at least two scales;
   obtaining preliminary disparity probability maps of at least two resolutions of the N channels based on the feature maps of the at least two scales, respectively; and
   for each channel, enlarging the preliminary disparity probability maps of the at least two resolutions to a resolution of the first image and superimposing the enlarged preliminary disparity probability maps, to obtain the disparity probability maps of the N channels.

20. The apparatus according to claim 17, wherein for a corresponding pixel position, in the disparity probability maps of the N channels, of a pixel corresponding to a foreground object in the first image, the pixel has a larger probability value in the disparity probability map of a channel corresponding to a large disparity than in the disparity probability map of a channel corresponding to a small disparity; and for a corresponding pixel position, in the disparity probability maps of the N channels, of a pixel corresponding to a background object in the first image, the pixel has a larger probability value in the disparity probability map of a channel corresponding to a small disparity than in the disparity probability map of a channel corresponding to a large disparity.

* * * * *